Patented June 29, 1954

2,682,524

UNITED STATES PATENT OFFICE 2,682,524

CROSS-LINKED POLYAMIDES BY REACTION OF POLYMERIC AMINES WITH OXALIC ESTERS

Donald D. Coffman, West Chester, Pa., assignor to E. I. du Pont de Nemours and Company, Wilmington, Del., a corporation of Delaware No Drawing. Application April 8, 1952, Serial No. 281,223

6 Claims. (Cl. 260—63)

This invention relates to new compositions of matter and to methods for obtaining them. More particularly this invention relates to new cross-linked polymers and methods for preparing them.

It is known (U. S. Patent 2,483,513) that basic linear polyamides are obtained when diprimary polyamines of the general formula

$$NH_2(CH_2)_x-NH(CH_2)_2-NH(CH_2)_xNH_2$$

are reacted with oxalic acid esters and that these products do not cross-link.

It is an object of this invention to provide new cross-linked polymers and methods for preparing them. A further object is to provide novel cross-linked polyamides. A still further object is to provide a method for obtaining cross-linked polyamides from certain selected polymeric amines. Another object is to provide novel cross-linked polyamides which form tough, hard, durable films resistant to solvents for ordinary polyamides. Other objects will appear hereinafter.

The objects of this invention are accomplished by providing new cross-linked polyamides which are the products obtained by reacting a polymeric polyprimary amine of the kind described hereinafter with an ester of oxalic acid. The polymeric polyprimary amines used in the preparation of the cross-linked polyamides of this invention are those which have a main carbon chain with at least three extra-catenic primary amino nitrogen groups thereon and which have a molecular weight in excess of 1000.

It has now been found that if instead of using polyamines of the kind described in U. S. Patent 2,483,513 there are employed with a diester of oxalic acid polymeric polyamines having a molecular weight in excess of 1000 and containing at least three primary amino groups, there are obtained cross-linked polyamides even at ordinary temperatures. As generally practiced, the cross-linked polymers of this invention are obtained by mixing at ordinary temperatures a diester of oxalic acid and the polymeric polyprimary amine in a common solvent in such proportions as to provide at least one ester group for each primary amino group in the polymeric polyprimary amine, and then removing the solvent either at ordinary temperatures, such as room temperature of 20° C., or at elevated temperatures up to 300° C.

The examples which follow are submitted to illustrate and not to limit this invention.

Example I

A solution of 8.9 grams of a polyamine having a neutral equivalent of 224.5, a molecular weight of 1550 and a primary amino nitrogen content of 3.63%, obtained by reductively aminating an ethylene/carbon monoxide copolymer, was prepared by dissolving the polyamine in an equal weight of toluene. To the resulting solution there was added 20 ml. of toluene and then 1.46 grams of diethyl oxalate. The mixture was cast on bonderized steel and on glass and the solvent allowed to evaporate at room temperature. After 72 hours aging the films were found to have a pencil hardness corresponding to HB at 3 mils thickness. Immersion of the dried films in water, 1% aqueous sodium hydroxide and an 85/15 ethanol/benzene mixture for 72 hours had no effect on the films.

A film of the above blend on bonderized steel, prepared by first permitting the solvent to evaporate at room temperature and then baking for 30 minutes at 150° C. was unaffected after 72 hours immersion in soap solution heated at 72° C.

Results analogous to the above were obtained with a blend similarly made, except that the solution was warmed for 30 minutes on a steam bath prior to the casting of the films.

Films of the polymeric polyamine itself were extremely tacky even after 16 hours standing in air at room temperature and after baking for 30 minutes at 150° C. Such films marred easily and were readily attacked by acidic solvents.

Replacement of the diethyl oxalate in the above compositions with diphenyl terephthalate, dimethyl diglycolate, or diethyl adipate lead to products which showed no curing properties, even after baking at 150° C. for 30 minutes.

Example II

A solution of 2.24 grams of the polyamine of Example I in an equal weight of toluene was diluted with 5 ml. of toluene. To this solution there was then added 0.5 gram of dibutyl oxalate. The blend was cast on glass, immediately following preparation, and the film baked at 150° C. for one hour. The resulting film was colorless and had a pencil hardness corresponding to HB at 3 mils thickness.

Example III

A 30% dioxane solution of a polyamine obtained by the amination of a vinyl acetate/allyl glycidyl ether copolymer, prepared as described hereinafter, was mixed with 0.18 gram of diethyl oxalate. The resulting blend was flowed on glass and the resulting film baked for 30 minutes at 150° C. The baked film was tack-free and had a pencil hardness corresponding to B at 3 mils thickness.

Air-drying led to films which were tack-free after 24 to 48 hours.

The vinyl acetate/allyl glycidyl ether copolymer from which the above polyamine was made was prepared as follows:

A mixture consisting of 171 grams of allyl glycidyl ether, 645 grams of vinyl acetate and 32.6 grams of benzoyl peroxide was placed in a reactor fitted with a stirrer, thermometer, and condenser and the mixture maintained at 71° to 92° C. for four hours. During this period there was added 212 grams of dioxane to maintain the temperature below 93° C. at reflux. The reaction mixture was cooled to 55° C. and placed under reduced pressure to remove unreacted monomers and dioxane. There were recovered 813 grams of a soft, viscous polymer which was readily soluble in most organic solvents. Analysis indicated that the polymer contained 19% allyl glycidyl ether. The product had a molecular weight of about 3150 and an equivalent weight of 600 per oxirane oxygen.

The above copolymer was aminated as follows:

One hundred eighty two grams of the copolymer was dissolved in 518 grams of dioxane and the solution was treated with 120 grams of anhydrous ammonia at 100° C. for four hours. Excess ammonia was then removed by distillation under reduced pressure, with slight warming. There resulted a solution (25.2% solids) of a polyprimary polyamine, which had a viscosity of 0.18 poise. To the polyamine solution water was then added to precipitate the polyamine. The precipitate was washed with water and dissolved in dilute acetic acid to give a solution which at 25.5% solids and pH 5.5 had a viscosity of 0.8 poise.

Films prepared from the polyamine itself by casting from aqueous acetic acid solution were tacky both after air-drying, and baking at 150° C. for 1 hour. These films were readily attacked by dilute acids and by organic solvents.

*Example IV*

Five grams of a solution prepared from 10 grams of a polyamine similar to that of Example I having a neutral equivalent of 269, a molecular weight of 1800 and a primary amino nitrogen content of 3.43%, and 15 grams of dioxane was blended with 0.5 gram of dimethyl oxalate. The resulting blend was flowed onto bonderized steel and the coating allowed to air-dry. The dried film was then baked for 30 minutes at 150° C. The baked film had excellent gloss and impact resistance. Then pencil hardness corresponded to HB at 2 mils thickness. Twenty hours contact of the film with 2% acetic acid or 2% sodium hydroxide had no effect on the film.

*Example V*

A solution of 0.6 gram of dimethyl oxalate in 2 grams of distilled water was mixed with 5 grams of a 40% solids solution in 10% acetic acid of a polyamine having a neutral equivalent of 433 and prepared by the reduction of a butadiene/methacrylonitrile copolymer, as disclosed and claimed in U. S. Patent 2,456,428. The resulting blend was flowed on bonderized steel and the film baked for 30 minutes at 150° C., after being air-dried. The baked film had a pencil hardness corresponding to HB at 1 mil thickness and had good mar and print resistance. Twenty hours contact with 10% acetic acid, 2% hydrochloric acid, or 2% sodium hydroxide had no effect on the film.

The polyamine used in the above experiment was prepared as follows:

Into a 5-gallon autoclave was charged 5,000 g. of decahydronaphthalene, 1,030 g. of methacrylonitrile, 50 g. of alpha,alpha'-azodiisobutyronitrile, and 3,750 g. of butadiene. The temperature was raised to 80–89° C. Two hours after reaching this temperature, 24 g. of alpha,alpha'-azodiisobutyronitrile in 120 g. of purified dioxane was injected. Three additional injections of the same quantity of catalyst were made at one and one-half hour intervals thereafter. The reaction temperature was held between 80 and 89° C. for 12 hours. The top pressure reached was 160 lb./sq. in. The solvent and unreacted monomers were stripped off in a flash still leaving 3,400 g. of polymer; yield 71%. Analysis indicated that the polymer contained 5.6% nitrogen and had a molecular weight of 2,700.

This polymer was hydrogenated to the polyamine as follows: To a shaker tube was added 1,630 g. of the butadiene/methacrylonitrile copolymer, 2,060 g. of decahydronaphthalene, 110 g. of ethylene glycol, 225 g. of nickel-on-carbon catalyst, 12.5 g. palladium-on-carbon catalyst, and 95 g. of liquid ammonia. This mixture was then treated with hydrogen at a temperature of 250° C. and a pressure of 1,500 lb./sq. in. for 14 hours. A total pressure drop of 2150 lb./sq. in. was noted during the reaction period. The product weighed 845 g., was light yellow, viscous, and exhibited good solubility in dilute acetic acid. It had a neutral equivalent of 433 and a Kjeldahl nitrogen content of 4.70%. The nitrogen present as primary amino groups was found to be 2.80%.

*Example VI*

A solution was prepared from 10 g. of a polyamine (N. E. 250) similar to that of Example I, having a molecular weight of 1650 and a primary amino nitrogen content of 3.43%, 20 g. of glacial acetic acid, and 10 g. of distilled water. To 4 g. of this polyamine solution was added 7.4 g. of a solution of 1.74 g. of diethyl N,N'-hexamethylenedioxamate in glacial acetic acid. The resulting reddish brown solution was cast on glass and baked for 60 minutes at 150° C. The resulting coating was clear, odorless, tack-free, and had excellent gloss. It showed fair resistance to print and mar tests and had a pencil hardness of B.

Diethyl N,N'-hexamethylenedioxamate was prepared as described below by modification of the procedure used by Gaade (Rec. Trav. chim., 55, 325–30 (1936)) for the preparation of diethyl N,N'-ethylenedioxamate.

To a solution of 292 g. (2 moles) of freshly distilled diethyl oxalate which was stirred and cooled to −8° C. was added a solution of 24 g. (0.2 mole) of hexamethylenediamine dissolved in 100 ml. of absolute ethyl alcohol. The addition of the diamine was conducted at such a rate that the temperature remained below 0° C. The resulting white slurry was stirred at the temperature of the ice bath for 30 minutes after the addition was completed and then for two hours at room temperature. Filtration yielded white crystals melting at 92.0–92.5° C. More diethyl oxalate was added to the filtrate, and the resulting solution was treated with another 24 g. sample of hexamethylenediamine in 100 ml. of alcohol as described above. The white solid was again removed by filtration, more diethyl oxalate was added, and the entire procedure repeated for a third time. The combined products were recrystallized from absolute ethyl alcohol to give platelets melting at 92.0–92.5° C. The yield of purified product was 160 g. (81.5% of theoretical).

*Anal.*—Calc. for $C_{14}H_{24}N_2O_6$: N, 8.85. Found: N, 8.76; 8.74.

Example VII

A useful coating was prepared from diphenyl oxalate and a polyamine having a NE of 241.5, a molecular weight of 1800 and a primary amino nitrogen content of 3.43%, similar to that of Example I, by first coating the surface with a solution of polyamine in ethyl cellosolve (ethoxyethanol) and then flowing over this a solution of diphenyl oxalate in dioxane.

A coating from a blend of the above polyamine and diphenyl oxalate was prepared by mixing 0.4 g. of diphenyl oxalate in 4 ml. of toluene with 0.6 g. of polyamine in 1.8 g. of toluene and immediately casting onto a glass plate. Because of the rapidity of the reaction between the polyamine and diphenyl oxalate it was necessary to cast the film within 1 minute of mixing to avoid gelation. The casting air dried to a hard, tack-free, cured film. It had a pencil hardness of HB after baking at 150° C. for 30 minutes. The properties of this film were the same as those previously noted for blends of other oxalates with similar polyamines.

Example VIII

To 2.65 g. of a 50% solution of the polyamine, similar to that used in Example VII, in toluene was added 1.1 g. of hexamethylene bis(monoethyl oxalate) dissolved in 3 ml. of toluene. This composition was flowed onto a bonderized steel panel at room temperature. After being air-dried, the panel was baked for 30 minutes at 150° C. This baked coating showed fair gloss, was tack free, and exhibited definite cure.

The hexamethylene bis(monoethyl oxalate) was prepared by the following two procedures:

(A) 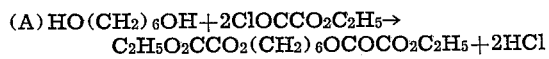

A solution in 25 ml. pyridine of 11.8 g. (0.1 mole) of hexamethyleneglycol was cooled to 0° C. With rapid stirring 27.3 g. (0.2 mole) of ethoxalyl chloride prepared from diethyl oxalate and phosphorus pentachloride as described by Weygand, Organic Preparations, Interscience Publishers, Inc., New York, 1945, p. 105, was added in a dropwise manner with cooling. The reaction temperature was maintained below 20° C. After the mixture was stirred at room temperature for one hour, the white slurry which had formed was poured into a mixture of ice and hydrochloric acid. The crystalline product which separated was recrystallized from absolute ethanol and separated by filtration in a cold dry box. This product was then distilled through a short path column; boiling point 173.0–176.5 at 0.7 mm. The colorless, clear distillate recrystallized on cooling to yield white crystals melting at 22.5–23.0° C.

*Anal.*—Calc. for $C_{14}H_{22}O_8$: C, 5.28; H, 6.96. Found: C, 53.2, 53.5; H, 7.22, 7.19.

(B) 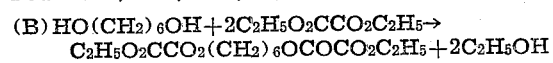

To a solution of 30 g. (0.25 mole) of hexamethyleneglycol and 219 g. (1.5 moles) of diethyl oxalate was added 0.1 g. of calcium hydride. The mixture was stirred for 19 hours while heating under reflux. The excess diethyl oxalate was removed by distillation under reduced pressure. The clear residue was then distilled to yield a clear, colorless liquid boiling at 185° C. at 2 mm.

*Anal.*—Calc. for $C_{14}H_{22}O_8$: C, 52.8; H, 6.96. Found: C, 52.21, 52.26; H, 7.15, 7.17.

Example IX

A solution was prepared at room temperature from 1.50 g. of hexamethylene bis(monomethyl oxalate), 2 g. of toluene and 4.32 g. of a 25% solution of the polyamine of Example VII in toluene. A bonderized steel panel and a sanded steel panel were coated with this composition. After being air dried these panels were baked at 150° C. for 30 minutes to yield tack-free coatings. These coatings showed good solvent resistance and a pencil hardness of HB.

Example X

To 4.88 g. of a 25% toluene solution of a polyamine similar to that of Example I having a neutral equivalent of 244, a molecular weight of 1550, and a primary amino nitrogen content of 3.63%, was added 1.1 g. of diethyl dithiooxalate. The mixture formed a clear, light yellow solution which was coated onto a bonderized steel panel. After being air dried for 18 hours, the panel was still somewhat tacky. However, when baked at 150° C. for 30 minutes, the coating was tack free. It had excellent gloss and impact resistance. At a thickness of one mil, the coating exhibited a pencil hardness of HB. Treatment with 2% acetic acid and 2% sodium hydroxide solution had no effect on the coating. However, 2% sulfuric acid caused a slight blush of the coating after 24 hours.

Example XI

An ethylene/carbon monoxide polyamine having a molecular weight of 2000, a neutralization equivalent of 248, and a primary amino nitrogen content of 4.93%, was converted to a 25% aqueous solution with the aid of 10% acetic acid, based on the weight of the polyamine. With the aid of a high speed mixer, 5.9 grams of diethyl oxalate were emulsified in 40 grams of the aqueous solution of polyamine. The resulting emulsion was used to prepare coatings on glass plates. The air-dried coatings were sticky, but a coating which was baked in an oven at 150° C. for 15 minutes was only slightly tacky. Similar coatings made without using diethyl oxalate were sticky after being similarly baked.

The polymeric polyprimary amines useful in the practice of this invention are those which have at least three primary amino nitrogen groups, and which have molecular weights in excess of 1000.

One type of polyamine is the product obtained by the reductive amination of ethylene/carbon monoxide copolymers, as described in U. S. Patent 2,495,255. This type of polymeric polyprimary amine is characterized by having a main carbon chain with amino nitrogens attached directly thereto by a single bond, the remaining valances of the amino nitrogen being satisfied by hydrogen atoms. These polymeric polyprimary amines may contain carbonyl carbon in the chain of carbon atoms comprising the main polymer chain and contain other functional groupings, such as —OH. A typical polymeric polyamine of this type is the following:

A stainless steel-lined pressure reactor is charged with 40 parts of an ethylene/carbon monoxide copolymer having a molecular weight of 1480 and an ethylene/carbon monoxide ratio of 10.4:1, 400 parts of benzene, and 40 parts of nickel-on-kieselguhr catalyst. The vessel is closed, evacuated and charged with 100 parts of anhydrous ammonia. The reactor is placed on a shaker machine and connected to a source of high pressure hydrogen. Hydrogen under pressure is charged into the reactor and heating and agitation are started. The temperature is raised to 200° C. and the pressure is adjusted to 200 atmospheres. These conditions are maintained for 15 hours. The reactor is allowed to cool, excess hydrogen and ammonia are bled-off, and the mixture of solvent, polymeric polyamine and catalyst are discharged from the reactor. The reaction mixture is diluted with benzene and filtered to remove the catalyst. Analysis of the solution shows it to contain 25% solids by weight. The product has a neutral equivalent of 525 and contains 82.15% carbon, 12.92% hydrogen, 3.12% nitrogen (Dumas method) and 2.61% primary aminonitrogen (Van Slyke method).

Another type of polyamine is that which has a main carbon chain and primary amino groups attached thereto through a hydrocarbon radical of from 1 to 25 carbon atoms, and preferably a hydrocarbon radical of 1 to 7 carbon atoms, such as alkylene, e. g., methylene, etc. Examples of such polymeric polyamines are the products obtained by reducing poly(3-pentenenitrile), the reduction product of poly(nitrostyrene), the reduction product of nitrated butadiene/styrene copolymers, the reductive amination products from vinyl ketone polymers and copolymers with vinylidene compounds, reduction products of polymers and copolymers of nitriles of the general formula,

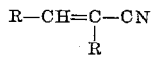

in which R is a member of the class consisting of hydrogen, an alkyl group, or an aryl group, with at least one other polymerization compound containing a $CH_2=C<$ group. Examples of such compounds are styrene, methyl styrene, 1,3-butadiene, isoprene, vinyl naphthalene, vinyl acetate, etc., as disclosed in U. S. Patent 2,456,428.

In the case of the acrylo- and alkacrylonitrile copolymers, it is generally desirable that the products hydrogenated contain at least one nitrile group for each 50 carbon atoms in the polymer chain. Because hydrogenation of the nitrile groups to aminomethyl groups is usually incomplete it is preferred that the starting polymers contain at least one nitrile group for each 25 carbon atoms in the polymer chain and that the hydrogenation be continued until the resulting polymeric amine contains at least one amino group for each 50 carbon atoms in the polymer.

Still another type of polyamine is the product disclosed and claimed in the copending application of M. E. Cupery, U. S. Serial No. 176,918, filed July 31, 1950, now abandoned, of which patent application Serial No. 295,127, filed June 23, 1952, is a continuation-in-part. In these products the amino-nitrogen atoms are part of an extralinear chain which contains oxygen in addition to carbon, generally an oxa-alkylene chain having one oxygen atom and from 3 to 4 carbon atoms connecting the amino nitrogen and the main carbon chain. Examples of such products are the amination products of copolymers of vinyl acetate with allyl glycidyl ether, of vinyl acetate with glycidyl methacrylate, of vinyl chloride with allyl glycidyl ether, etc.

The preferred oxalic acid esters for use in the practice of this invention are dioxalates which correspond to the general formula

RO—CO—CO—OR in which R is the nonhydroxyl portion of an aliphatic monohydric alcohol, especially a monoalkanol of 1 to 18 carbon atoms because of their availability, relatively low cost, and high order of reactivity. However, in place of these and as equivalents thereof, there can be used mixed diesters of monohydric and dihydric alcohols, esters with sulfur functions, and esters with amide functions. Generically, the esters which are useful in the practice of this invention conform to the general formula ROCOCOX, in which X is —OR, —ZY—Z—COCOOR, or

—NR'Y·NR'COCOOR in which R is a monovalent hydrocarbon radical, such as an aryl radical or an alkyl radical of 1 to 18 carbon atoms, Y is a divalent organic radical which may be wholly hydrocarbon or which may have heteroatoms such as nitrogen, oxygen, or sulfur interrupting the carbon chain, Z is oxygen or sulfur, and R' is hydrogen or a hydrocarbon radical, such as an aryl radical or an alkyl radical of 1 to 18 carbon atoms.

The simple diesters conform to the general formula ROCOCOOR, in which R is the nonhydroxyl portion of an aliphatic monohydric alcohol such as methyl, ethyl, butyl, amyl, octyl, 2-ethylhexyl, dodecyl, and decyl alcohols, pentene-1-ol, octene-1-ol, and the like alcohols. The preferred diesters are dialkyl oxalates, particularly those of the lower alkanols such as, methanol, ethanol, butanol because of their greater reactivity.

The mixed diesters are the products obtained by reacting an oxalyl compound of the formula ROCO—COB in which R has the previously indicated meaning and B is halogen with a glycol such as 1,2-ethanediol, 1,3-propanediol, 1,5-pentanediol, 1,8 - octanediol, 1,12 - dodecanediol, beta,beta' - dihydroxyethyl ether, N(beta - hydroxyethyl)aminoethanol, beta,beta'-dihydroxyethyl thioether, and the like. They can also be prepared from dialkyl oxalates and the glycol by ester interchange. These mixed diesters correspond to the general formula

ROCOCO—O—Y—OCOCOOR in which R and Y have the previously indicated meanings. Of this class of esters the preferred type are those in which Y is the nonhydroxyl portion of a glycol containing up to 6 carbon atoms because of availability and lower cost.

Mixed esters with sulfur functions are obtained by methods similar to the mixed diester, except that a dithiol is used in place of the glycol. These esters conform to the general formula ROCOCOSYSCOCOOR, in which Y and R have the previously indicated meanings. Suitable dithiols for use in preparing these esters are 1,2-ethanedithiol, 1,3-propanedithiol, 1,10-decanedithiol, 1,18 - octadecanedithiol, beta,beta'-dithiolethyl ether, and the like.

Mixed esters with nitrogen functions are made by reacting the diamine with an amount of oxalate in excess of that theoretically required to form the dioxamate. Suitable diamines are 1,2-diaminoethane, 1,3-diaminopropane, 1,6-diaminohexane, 1,12-diaminododecane, 1,18-diaminooctadecane, bis(4 - aminocyclohexyl)methane, phenylenediamine, 3 - methoxy-hexamethylenediamine, bis-3-aminopropyl ether, 5-methylenenonane-1,9-diamine and the like.

In preparing the crosslinked polyamides of this invention it is only necessary to mix the polymeric amine and oxalic ester, often in a common solvent, which may then be removed at a temperature in the range of 25 to 300° C. A convenient way is by casting the solution on a plate or tray and permitting the solvent to evaporate either at atmospheric pressure or under reduced pressure. For practical reasons it is desirable to employ solutions of as high concentration as possible as this eliminates the need for removing unnecessarily large amounts of solvent during the crosslinking operation.

Although in actual practice it is preferred to employ the oxalic ester and polymeric amine in such ratio as to provide 1:1 ester groups per primary amino group in the polymeric amine, it is to be understood that departure can be had from this ratio. Thus, the oxalic ester can be used in amounts sufficient to provide 1:2 ester groups per primary amino group in the polymeric amine with satisfactory results.

Suitable solvents are toluene, dioxane, xylene, etc. When the polymeric amine is not organic solvent soluble it may be converted to a salt, as disclosed in U. S. Patent 2,579,033. In such instances, the polyamine is dissolved in water and the ester is added to the solution. Instead of using a preformed salt of the polyamine, the salt may be made in situ by adding the polyamine to water containing the amount of acid required to form the salt. The preferred salts are the carbonates because of the ease of liberation of the polyamine.

The products of this invention are tough, hard, polymers which resist solution in solvents for ordinary polyamides. These cross-linked polyamides show excellent durability when exposed in thin films outdoors and are admirably adapted for use as protective coatings for all sorts of substrates, e. g., metals, textiles, wood, and the like.

As many apparently widely different embodiments of this invention may be made without departing from the spirit and scope thereof, it is to be understood that this invention is not limited to the specific embodiments thereof except as defined in the appended claims.

I claim:

1. A cross-linked polyamide which is the product obtained by reacting an ester of oxalic acid with a polymeric polyprimary amine having a molecular weight in excess of 1000 and having a main chain consisting solely of carbon atoms with at least three extra-catenic primary amino nitrogen groups thereon.

2. A cross-linked polyamide which is the product obtained by reacting an ester of oxalic acid with a polymeric polyprimary amine having a molecular weight in excess of 1000 and having a main chain consisting solely of carbon atoms with at least three extra-catenic primary amino nitrogens each directly attached by a single bond to the main carbon chain.

3. A cross-linked polyamide which is the product obtained by reacting a diester of oxalic acid with a polymeric polyprimary amine having a molecular weight in excess of 1000 and having a main chain consisting solely of carbon atoms with at least three extra-catenic primary amino nitrogens each directly attached by a single bond to the main carbon chain, said polymeric polyprimary amine being the product obtained by the reductive amination with ammonia and hydrogen of a copolymer of ethylene and carbon monoxide.

4. A cross-linked polyamide which is the product obtained by reacting a dialkyl oxalate with a polymeric polyprimary amine having a molecular weight in excess of 1000 and having a main chain consisting solely of carbon atoms with at least three extra-catenic primary amino nitrogen groups thereon.

5. A cross-linked polyamide which is the product obtained by reacting a dialkyl oxalate with a polymeric polyprimary amine having a molecular weight in excess of 1000 and having a main chain consisting solely of carbon atoms with at least three extra-catenic primary amino nitrogens each directly attached by a single bond to the main carbon chain, said polymeric polyprimary amine being the product obtained by the reductive amination with ammonia and hydrogen of a copolymer of ethylene and carbon monoxide.

6. A cross-linked polyamide which is the product obtained by reacting diethyl oxalate with a polymeric polyprimary amine having a molecular weight in excess of 1000 and having a main chain consisting solely of carbon atoms with at least three extra-catenic primary amino nitrogens each directly attached by a single bond to the main carbon chain, said polymeric polyprimary amine being the product obtained by the reductive amination with ammonia and hydrogen of a copolymer of ethylene and carbon monoxide.

References Cited in the file of this patent

UNITED STATES PATENTS

| Number | Name | Date |
| --- | --- | --- |
| 2,483,513 | Allen | Oct. 4, 1949 |
| 2,483,514 | Allen | Oct. 4, 1949 |